United States Patent [19]

Smith et al.

[11] Patent Number: 4,615,591
[45] Date of Patent: Oct. 7, 1986

[54] MECHANICAL POSITIONING DEVICE FOR SCIENTIFIC INSTRUMENTS

[75] Inventors: Ian R. Smith, London; Robert A. Harvey, East Grinstead, both of England

[73] Assignee: VG Instruments Group Limited, United Kingdom

[21] Appl. No.: 600,146

[22] Filed: Apr. 13, 1984

[30] Foreign Application Priority Data

Apr. 13, 1983 [GB] United Kingdom ............... 8310011

[51] Int. Cl.$^4$ ............................................. G02B 21/00
[52] U.S. Cl. .................................... 350/507; 248/576
[58] Field of Search ................ 350/520, 531; 181/139, 181/176, 179, 206; 248/576, 591, 604

[56] References Cited

U.S. PATENT DOCUMENTS

| 3,318,593 | 5/1967 | Guernet | 269/60 |
| 3,780,298 | 12/1973 | Agadzhanian et al. | 250/202 |
| 4,028,933 | 6/1977 | Lemons et al. | 73/67.6 |
| 4,030,342 | 6/1977 | Bond et al. | 73/67.5 R |

FOREIGN PATENT DOCUMENTS 2123871 12/1971 Fed. Rep. of Germany .
379149 8/1964 Sweden .

OTHER PUBLICATIONS

Proceedings of the IEEE, vol. 67, No. 8, Aug. 1979, pp. 1092–1114, *Acoustic Microscopy with Mechanical Scanning*, by Quate et al.
IBM Technical Disclosure Bulletin, *Frictionless X, Y, Z and Theta Micropositioning Table*, by J. Aronstein, L. W. Holmstrom, May 1973.

Primary Examiner—John K. Corbin
Assistant Examiner—Vincent J. Lemmo
Attorney, Agent, or Firm—Bacon & Thomas

[57] ABSTRACT

The invention comprises a compact substantially frictionless positioning device for guiding the motion of an object accurately along one or two axes. The object is supported on a pair of parallel motion solid hinges disposed either side of the axis of motion, each hinge comprising two flexible arms disposed in one plane. Springs are provided at one end of each hinge arm to permit the movement of the object along the axis and to restore it to its rest position when the displacing force is removed. Preferably the hinge arms and the springs are of rectangular cross-section to confine the motion of the object to one plane without the need for additional guides. The displacing force may conveniently be provided by an electromagnetic drive motor, the stator of which may be mounted on a further double parallel motion solid hinge assembly to minimize the change in the center of gravity which would otherwise occur when the object is displaced. A two axis device can be made by mounting a second positioner on the movable part of the first. A variety of forms of the device are possible, facilitating this combination. The positioning device is especially suitable for use as an x-y scanner in scanning microscopy, and may be used for mounting the acoustic lens on the turret of a combined imaging optical and scanning acoustic microscope.

20 Claims, 9 Drawing Figures

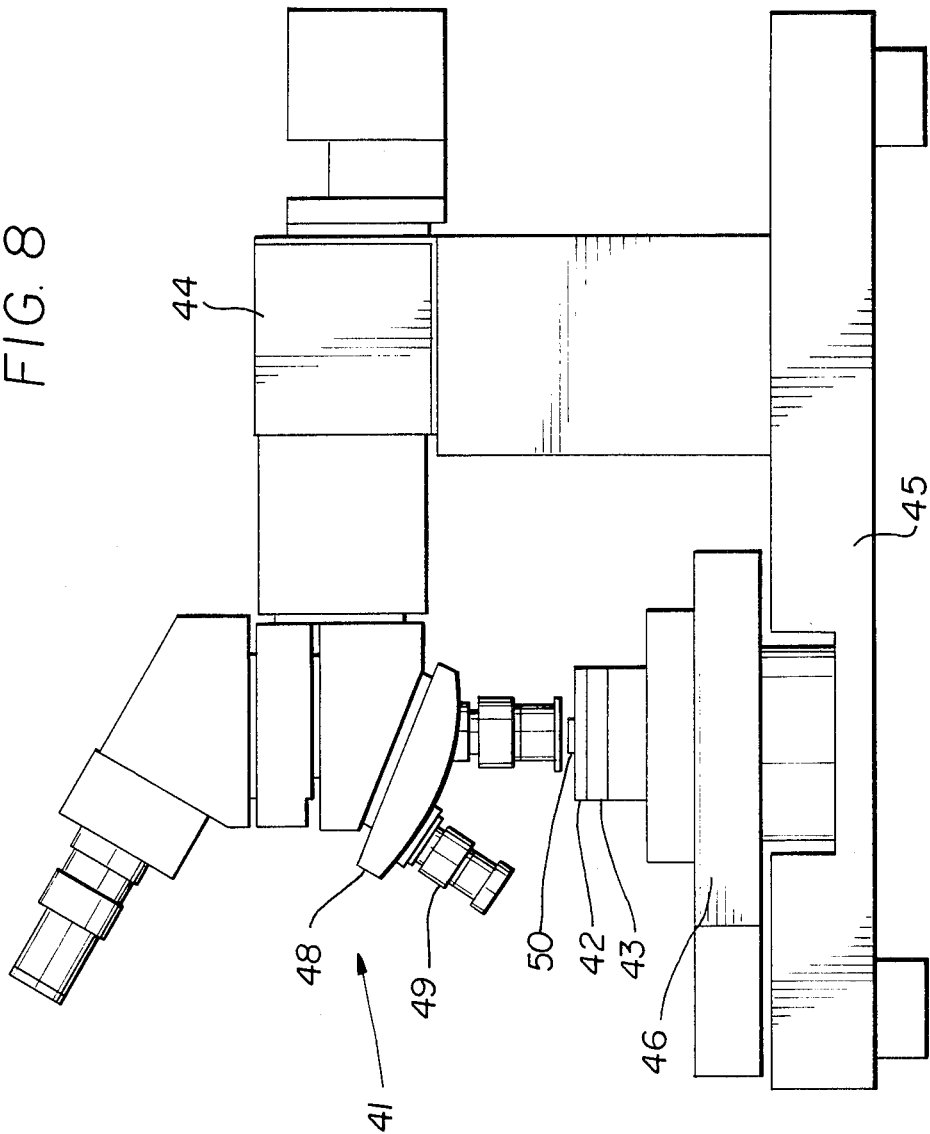

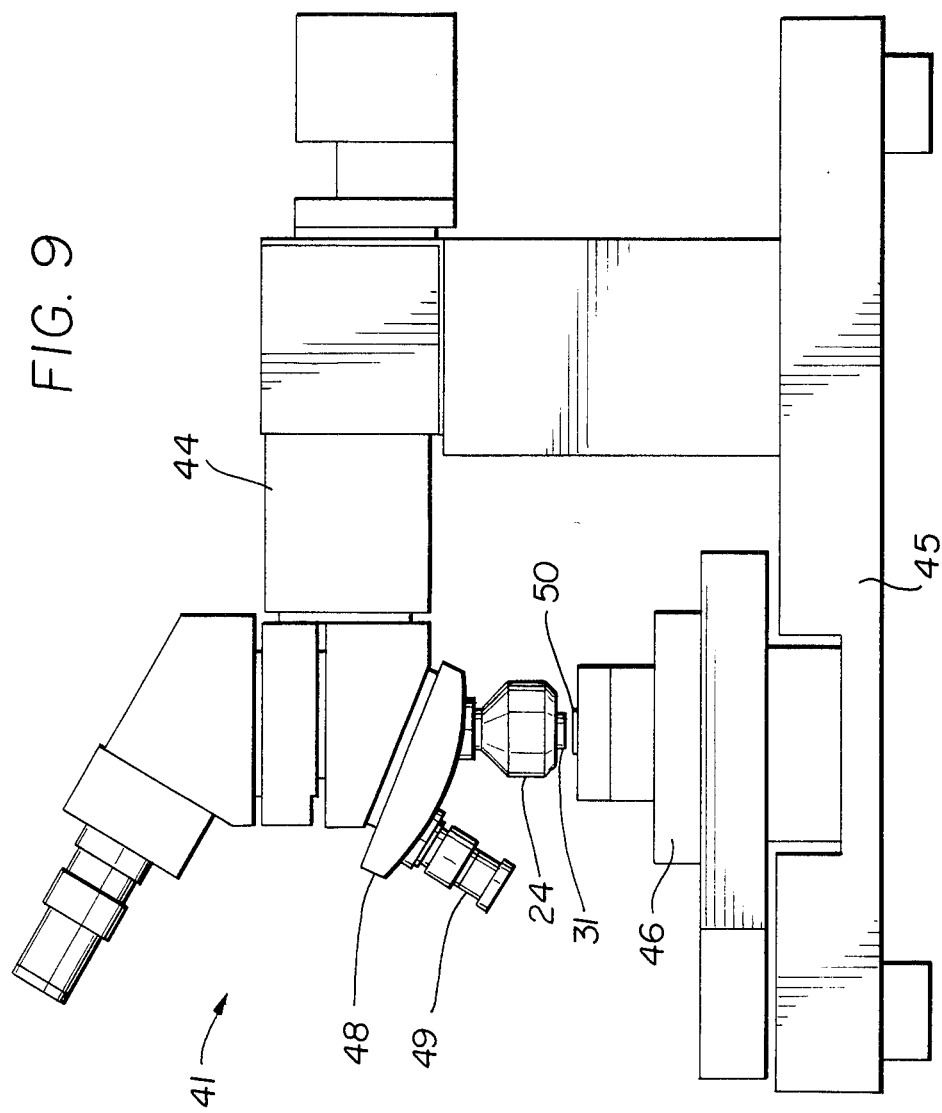

MECHANICAL POSITIONING DEVICE FOR SCIENTIFIC INSTRUMENTS

TECHNICAL FIELD

This invention relates to devices for accurately positioning an object in a desired location, and to scanned image microscopes of various types incorporating such devices.

BACKGROUND ART

The problem of providing a mechanical device which will provide accurate positioning of an object in a particular location, or will produce guided motion along one or more axes, is frequently encountered in mechanical engineering in general and in the design of scientific instruments in particular. In scanned image microscopy, a point source of radiaton and a single detector are used, and the object or some part of the microscope itself is moved so that the image is recreated point by point, either in a computer memory or on a cathode ray tube display, rather than producing a complete image at any given instant as in conventional optical microscopy. Such instruments clearly require a precisely constructed mechanical device which can move the object, or an appropriate part of the microscope, in a closely controlled way, usually in two dimensions, and generally at quite high speeds in order that the time taken to build a complete picture is not excessive. There are many known examples of such devices, incorporating a wide variety of techniques. The simplest way of guiding motion along one axis is to employ a sliding carriage mounted between two guides or slides, which themselvs can incorporate a wide variety of bearings. Motion along a second axis may be allowed by mounting the first set of guides on the carriage of a second set positioned at right angles to the first. The slides can be driven by rotating screws or linear positioners of any type. It is known to be possible to adapt such mechanisms to operate on very small scales, and to provide a highly controlled motion of small amplitude to drive the carriages by means of reducing mechanisms such as gears or levers, or electromagnetic or piezoelectric transducers. Such devices are frequently encountered in scientific instruments of various kinds. However, mechanical devices of this kind are prone to develop wear which can impair the accuracy of the positioning, and suffer from friction which can lead to sticking, making it difficult to produce a small displacement slowly and without overshoot. They usually require lubrication, and in some cases such as use in a high vacuum system or where it is important to ensure that there is no risk of chemical contamination, this can preclude their use. They can also be expensive to manufacture, because they involve a large number of moving parts which require precise machining. A need exists, therefore, for a simple mechanism which is capable of guiding motion along one or more axes which involves no parts in sliding contact with each other and is capable of fast vibration free positioning of an object and which is adapted for use in scientific instruments.

A simple device which is often used to guide a limited motion along a particular axis is the parallel motion solid hinge. In its simplest form, this consists of a fixed support to which two parallel thin arms of equal length are attached, and a moving block attached to the free ends of the arms. The rest position of the block is such that the arms are straight and at right angles to the support and the block. If a force is applied to the block at right angles to the arms and in the plane in which they both lie, the block will move in the direction of the force so that both arms are deflected, which also results in the block moving slightly closer to the support. If the arms are made of a resilient material, the block will return to its rest position with the arms straight as soon as the deflecting force is removed. If the arms are made from material with a rectangular cross-section, the block will experience a powerful restoring force if it moves out of the plane of the applied force because of the resistance of the arms to bending across the long side of the rectangular section, and thus no additional guides are necessary to keep the motion in the plane of the applied force. The slight inward motion away from the axis of the applied force as the block is deflected is put to a practical use in the construction of narrow resolving slits for spectrometers, which require very precise adjustment of the width, but the parallel motion solid hinge is also used to guide motion along the axis of the applied force, because this deviation from the axis of the force is very small if the extent of the motion is small in comparison with the length of the arms. It is especially suitable for providing an oscillatory motion, because of the presence of the restoring force due to the resilience of the arms, and the absence of any frictional forces. Despite these advantages, however, it is limited in application because of the very limited movement which is possible before the deviation from true axial movement becomes unacceptable. This can be reduced by employing very long hinge arms, but the longer these arms are the weaker is the resistance to movement out of the desired plane of motion, which may also be a serious limitation on the use of the device.

It is an object of the present invention, therefore, to provide a substantially frictionless mechanical positioning device based on the principle of the parallel motion solid hinge which is capable of guiding motion accurately along a particular axis over its entire working range, and one in which the working range is very much greater than a simple hinge of comparable dimensions. It is a further object to provide a substantially frictionless mechanical positioning device which is capable of the independent simultaneous positioning of an object along two axes. It is a further object of the invention to provide a scanning microscope using any form of incident radiation which incorporates a mechanical scanning device based on the positioning device described, and it is another object of the invention to provide a combined optical and scanning acoustic microscope incorporating such a scanner the construction of which would otherwise have been impossible.

SUMMARY OF THE INVENTION

Thus, according to one aspect of the invention, there is provided a substantially frictionless positioner for guiding the motion of an object along an axis when a displacing force is applied, said positioner comprising a movable object member connected to a supporting means fixed relative to said axis by two matched parallel motion solid hinges disposed on opposite sides of said axis in a common plane, each said parallel motion solid hinge comprising two or more flexible tie members and at least one stretchable spring means which maintains said tie members in tension, said stretchable spring means and said tie members operating to permit motion of said movable object member from a rest position fixed relative to said supporting means along said axis without displacement therefrom and to return said movable object member to said rest position when said displacing force is removed.

The flexible tie members of the hinge assemblies are preferably strips of rectangular cross-section with the thinner dimension in the plane in which both strips of each hinge lie. However in general strips will be suitable whose cross-section is such that bending out of the plane in which both strips of each hinge lie is resisted.

In this way, the problem of the motion deviating from the desired axis inherent in the simple parallel motion solid hinge is overcome e.g. by allowing the other ends of the tie members which form the arms of the hinges to move inwards on spring loaded mountings as the object member is displaced. The object will therefore move accurately along the desired axis providing that the two hinges are of identical construction, i.e., matched. It is preferable to make the flexible tie members very thin, and with a minimum resilience, unlike the simple parallel motion solid hinge, so that they exert only a minimum restoring force on the displaced object member, and that the range of movement of the object member is determined chiefly by the extent to which the outer ends of the tie members can be permitted to move towards each other. Because this distance is very much smaller than the distance through which the object member is displaced, it is relatively easy to provide simple stretchable spring means which do not exert an excessive restoring force at the limits of displacement, and to provide springs means for each tie member or pair of tie members which are sufficiently similar to ensure that the motion remains accurately along the desired axis. These springs means may take a variety of forms, but in order to ensure that the motion of the object member remains substantially in one plane it is necessary to ensure that the parallel motion hinges remain in that plane. If this is to be done without guides, the springs means must be capable of extension only in one plane. This is most conveniently achieved by making the springs means from a resilient thin strip of rectangular cross section bent along a line at right angles to its longest edges, so that the distance between its ends can be varied by altering the angle of the bend. Several bends can be incorporated if desired. The positions of these spring means relative to the tie members can be varied to give different versions of the device. For example, if the outer ends of each pair of tie members are connected by an intermediate rigid member, each end of the intermediate rigid member can be attached via spring means to a supporting means, e.g., by being supported by a spring from a fixed point, so that the intermdiate rigid member remains parallel to the desired axis of motion as the ends of the tie members move inwards. Alternatively, the spring means may form part of an intermediate member itself. It is also possible to join the ends of the tie members themselves directly to fixed supporting means by means of individual spring means. In another version, the outer ends of the tie members could be fixed, and the spring means incorporated between the tie members and the movable object member. In a still further version, the tie members and spring means may be combined in a composite part which is resiliently stretchable or which incorporates a resiliently stretchable section. These composite parts are maintained under tension, thereby providing a restoring force for returning the object member to its rest position, by ensuring that they are stretched on the assembly of the positioner by fabricating them with their unstretched length less than the distance necessary to connect the object member to the supporting means without stretching. The version of the invention used will be selected according to the application, and other versions apart from those described are also possible.

The positioning devices of the invention may comprise a plurality of component parts; however it is generally preferable that the devices be of unitary construction.

The driving force required to move the object member may of course take any convenient form. A very convenient one, however, is provided by means of an electromagnetic motor, a simple form of which consists of a coil mounted on the object member, and a permanent magnet or magnets mounted on fixed points close to the coil. However, with an arrangement of this type a reactionary force is exerted on the magnet when the object is displaced from its rest position. In some cases, especially when the device is used to guide a fast oscillatory motion, this effect can result in excessive vibration and strain on its fixings. If the device is combined with another device which guides motion along another axis, the vibration can also couple the motion along one axis into the other, which is a very serious defect. Therefore the invention further consists of a substantially frictionless positioner as previously described further comprising an electromagnetic drive motor for providing said displacing force and comprising at least one armature and at least one stator, said armature being attached to said movable object member and said stator being mounted on a stator mounting means by at least one further parallel motion solid hinge comprising two flexible and stretchable tie member, the resilience and length of which are selected so that when said movable object member is displaced, displacement of said stator in the opposite direction reduces the change in the position of the centre of gravity of said positioner. In order to achieve balancing in this way, the distance of travel of the stator and the armature must be related to their relative masses. This is most conveniently achieved by mounting the heaviest part of the motor on the additional parallel motion solid hinge, and the lightest part on the object to be moved. The length and rigidity of the tie members of the additional parallel motion solid hinges for stator mounting can then be adjusted to provide the desired degree of balancing, and because they support the heaviest part of the motor, they will be shorter than the flexible tie members which support the movable object member, and the distance travelled by the stator will be significantly less than that travelled by the object member. This allows a very compact form of construction, and substantially maintains the efficiency of the motor.

A further refinement can also be made to this concept to maintain a more accurate alignment of the components of the drive motor. It will be clear from the foregoing description that if the motor stator is mounted from its supporting means by a parallel motion solid hinge and if the tie members of this hinge are short, the stator will move off the desired axis of motion as it is deflected, which could lead to inaccuracy in positioning the object member. This can be overcome by mounting the stator on two matched parallel motion solid hinges so that its mounting becomes similar to the main invention, and its axis cannot deviate from the axis of motion. Clearly some resilient means must be incorporated in the stator or its mountings as required by the invention, but because the extent of travel is usually much less than that of the armature, this can be of a very simple nature. The amount of movement to be absorbed by the resilient mountings can be reduced by mounting the stator hinges not directly on supporting means but instead on intermediate rigid members in the form of moving plates or bars connected to the outer ends of the flexible tie members of the first form of the invention. This in fact overcompensates for the amount of movement, but has the advantage that an additional linkage is provided between the ends of the flexible tie members, which further increases the resistance to twist of the main hinges and ensures that the plane of motion cannot move out of the plane of the device. The small difference in the amount of inward motion between the stator hinges can be absorbed by providing a small degree of resilience in the mountings of the stator.

It is often necessary to provide independent motion of an object simultaneously along two axes, usually at 90° to one another. Thus the invention further provides a substantially frictionless positioner for guiding the motion of a primary object member along two axes, said positioner comprising a first positioner as previously described, the movable object member whereof comprises said primary object member, the said supporting means of said first positioner being rigidly connected to the movable object member of a second positioner as previously described, and the said axes of said first and second positioners being aligned with the two axes along which said primary object member is to be guided.

There are many ways in which this combination can be realized in practice, but a particularly convenient one is described in detail later.

It will be appreciated that a positioning device constructed according to the invention can provide an oscillatory motion of an object along one or two axes, and is therefore ideally suited for scanning the position of an object in the same way as a spot is scanned to form the raster of a television picture. A motion of this type is an essential feature of all scanning microscopies, and of acoustic microscopy in particular. The principles of scanning microscopy have been known for many years, and microscopes constructed according to these principles are well known. They have a number of advantages over conventional imaging microscopes, even in the case of optical instruments, because the use of the scanning technique allows the construction of very high resolution microscopes and instruments which operate with other types of radiation than visible light, e.g., infra red or ultraviolet electromagnetic radiations, or acoustic waves. In acoustic microscopy, the radiation used is a high frequency sound wave, in some cases 3 or 4 GHz, which is focused on to the object by means of an acoustic lens. The amplitude and phase of the incident wave are modified by the object, and the modified wave is either received by a second lens (transmission mode) or reflected back through the first lens (reflected mode). The source of the acoustic waves is usually a piezoelectric transducer connected through a microwave amplifier to a source of radio frequency electrical energy, and the detector is also a piezoelectric transducer connected to a microwave amplifier. The lens used is frequently a sapphire rod with a concave hemispherical socket ground in the end, and the acoustic waves are coupled to the object through a medium such as water. If the reflection mode is used, the acoustic energy is applied in the form of very short pulses so that the period between the pulses can be used to detect the pulses reflected back from the object through the same lens and transducer. The object is moved mechanically in the manner of a spot tracing a raster of a television picture so that each point in the area of interest appears sequentially at the on-axis focus of the lens. The signal received by the detector at any instant therefore consists of the original acoustic wave modified in both phase and amplitude by the elastic properties of the object at the particular point which is positioned at the focal point of the lens at that instant, and as the object is moved the changing signal can be used to vary the intensity of a spot on a cathode ray tube which is scanning in synchronism with the movement of the sample. In this way an acoustic image of the scanned area of the object can be displayed on a screen. It is always necessary to scan the object because with present technology it is not practical to construct suitable arrays of acoustic detectors, nor lenses which have a sufficiently good performance to produce a sharply focused image of points away from their optical axis which would be necessary to produce a complete acoustic image. Clearly, the performance of the scanning acoustic microscope depends critically upon the precision of the scanner which is used to move the object, and as it is possible to construct acoustic lenses which have a resolution of 0.5 microns, the performance of the scanning device is of vital importance. It will be appreciated, however, that it is not essential that the object itself be moved, and in many cases it is preferable that the lens or the radiation source is moved instead, especially when the object is bulky or heavy. Very similar requirements apply to the scanners used in all other forms of scanning microscopy.

Up to now, the scanners used in scanning microscopies in general, and in acoustic microscopy in particular, have been relatively complicated and bulky, and involved a large number of moving and sliding parts. Considerable advantage is therefore to be had from using a single- or two-axis positioner constructed according to the present invention as a vital component in a scanning microscope. Thus the invention further provides a scanning microscope comprising at least one positioner according to the invention and a movable stage for scanning the position of an object to be examined, said stage being guidable along an axis when a displacing force is applied by means of said positioner. Alternatively, the object can be maintained in a fixed position, and the lens or other appropriate part of the microscope can be scanned over the object by means of a positioner as previously described. This version is especially suitable if the object to be examined is relatively large. Preferably a two axis positioner employing electromagnetic drive motors is used but as a fast oscillatory motion is only essential along one axis, a single axis positioner can be used and the motion along the other axis provided by a conventional screw driven slide system.

It will be further appreciated that the information given by acoustic microscopy and optical microscopy is different. For example, acoustic waves will penetrate into an optically opaque sample, and information about its internal structure can be obtained. Also, an acoustic image is dependent on the mechanical properties of an object, and information can therefore be obtained about the structure of optically transparent objects without staining, which is especially important for biological specimens. A great deal of information can also be deduced from consideration of the phase change in an acoustic wave caused by an object, or by operating with the object slightly displaced from the focal plane, none of which can be obtained by optical microscopy. In many respects, therefore, optical and acoustic microscopy are complementary techniques, and considerable advantage is to be had by combining them in a common instrument. Until recently, however, this combination was regarded as impractical, largely because of the bulky nature of the scanners used in acoustic microscopy which largely determined the physical construction of the instrument. However, the use of a compact and efficient scanner constructed according to the invention clearly allows such a combination to be realized in practice. Thus the invention further provides a combined imaging optical and scanning acoustic microscope equipped with a rotating turret which carries at least one optical objective lens and an acoustic lens and transducer assembly wherein said acoustic lens and transducer assembly is mounted on a substantially frictionless positioning device constructed as previously described, so that a complete optical or a scanned acoustic image of the object can be produced by selecting the appropriate position of the turret. Preferably the position of the transducer on the turret should be arranged so that with the scanner at rest, the on-axis focal point of the acoustic lens lies at the same position on the sample as the on-axis focal points of each of the optical objectives provided when they are in the operating position, so that optical and acoustic images of the same area of the object can readily be produced. Using a device of this type, it is a relatively simple matter to convert a conventional optical microscope to a combined instrument by replacing one of the optical objectives with the acoustic lens and scanner.

BRIEF DESCRIPTION OF THE DRAWINGS

The invention will now be described in greater detail by way of example by reference to the accompanying figures in which:

FIG. 8 is a schematic view of a scanning microscope incorporating the positioner of FIG. 3; and, FIG. 9 is a schematic view of a combined acoustic-optical scanning microscope incorporating the lens assembly of FIG. 6.

DETAILED DESCRIPTION OF THE INVENTION

Figure 1:
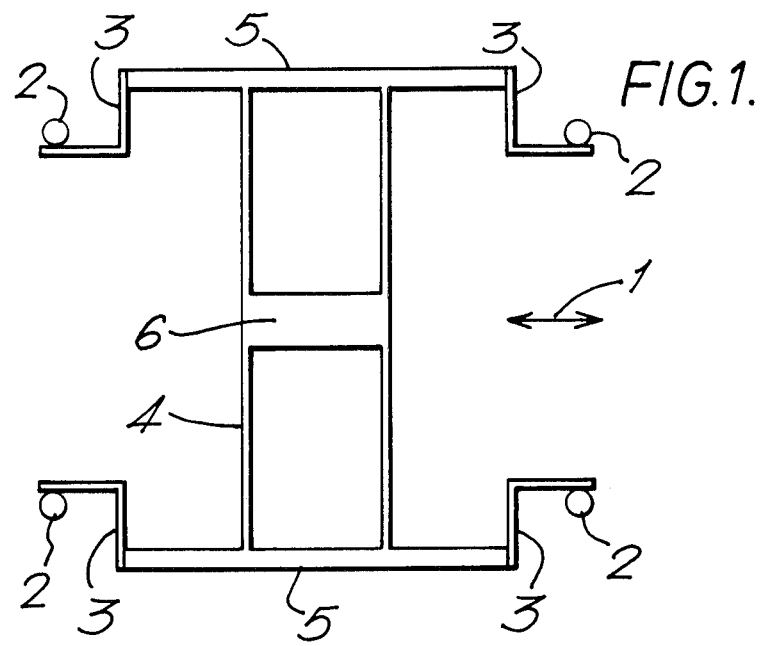
FIG. 1 is a view of a single axis positioner constructed according to the invention.

Referring first to FIG. 1, which shows one version of a single axis positioner according to the invention, flexible tie members comprising two thin strips 4 of rectangular cross-section are attached at their mid-points to a block-line movable object member 6. The ends of strips 4 are attached to two supporting bars 5, which constitute the intermediate rigid members of the positioner, so that the strips 4 are parallel and at right angles to the bars 5 when the device is at rest. The ends of bars 5 are attached by stretchable spring means in the form of four right-angled springs 3, also of rectangular cross-section, to four fixed mounting points 2 which provide a supporting means for the positioner. Application of a force to object member 6 along axis 1 results in the object member moving along axis 1 and the bending of the very thin srips 4, which in turn cause bars 5 to move together, bending springs 3. When the force applied to object member 6 is removed, springs 3 will cause bars 5 to return to their original position and restore object member 6 to the centre. Providing that springs 3 are identical and the device is symmetrical, the movement of object member 6 will be accurately aligned with the axis 1.

Figure 2:
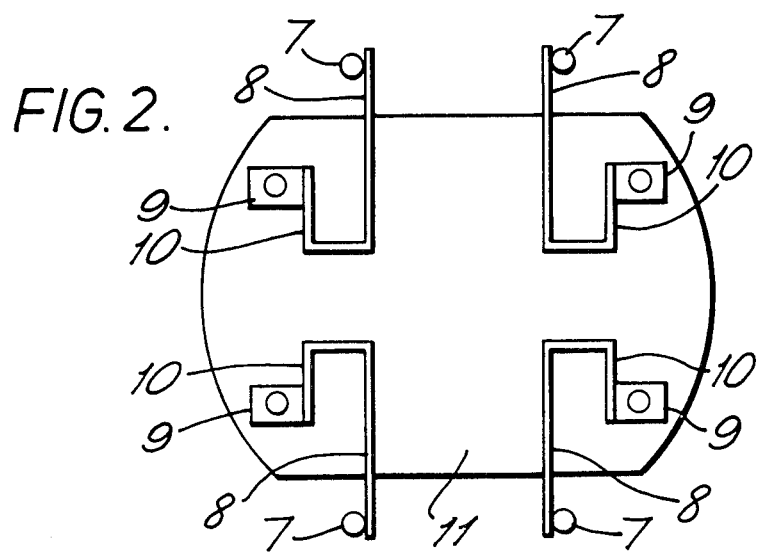
FIG. 2 is a view of a single axis positioner constructed according to an alternative version of the invention.

FIG. 2 shows an alternative form of a single axis positioner. In this version, four thin strips of rectangular cross section 8 are attached to four fixed mounting points 7, and the other end of each strip is attached to a right angled spring 10, also of rectangular cross section. The other ends of srigns 10 are each attached to a block 9, and all four blocks 9 are in turn attached to a plate-like movable object member 11. Blocks 9 are positioned on plate 11 so that with the object member at rest strips 8 are parallel and symmetrically positioned as shown in FIG. 2. Application of a displacing force to object member 11 at right angles to strips 8 will result in the object member moving along the axis of the force, and strips 8 being deflectd in the manner of the strips 4 in FIG. 1, with springs 10 bending to allow the deflection of strips 8. Springs 10 also provide a restoring force on object member 11 when the deflecting force is removed. Although both versions of the device have applications, in general the version shown in FIG. 1 is to be preferred because the mass of the moving parts is smaller. It will be seen from the figures that it is convenient to make the thin strips 4 and 8 the same depth as the springs 3 and 10, but the springs should be of thicker material than the strips in order to provide an adequate restoring force and to ensure that the ends of the strips remain in the correct places. The materials chosen for the construction, and the details of the assembly, can be varied to suit the application, but phosphor bronze or stainless steel are particularly suitable for the springs and strips. The depth of the springs and strips should be chosen to ensure adequate resistance to twisting motions which would result in the central part moving out of the desired plane. Typically the depths of the springs and strips will lie between $\frac{1}{8}$ and $\frac{1}{4}$ of the length of the hinge strips.

Figure 3:
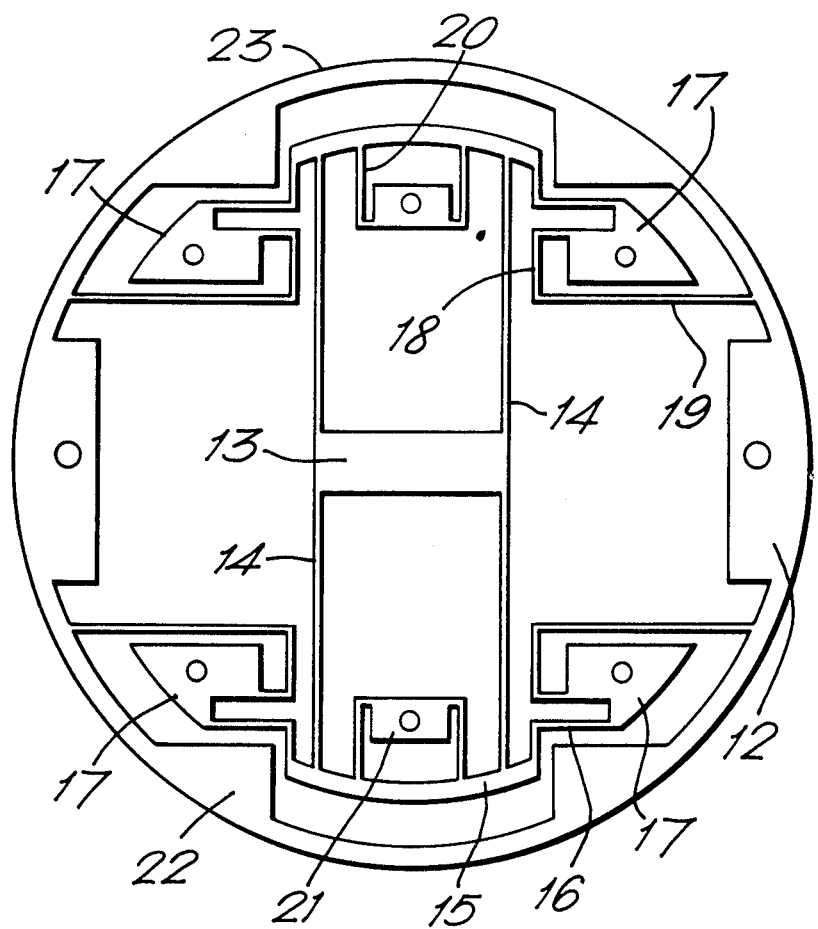
FIG. 3 is a view of a two axis positioner incorporating mountings for a drive motor as provided by a further form of the invention.
Figure 7:
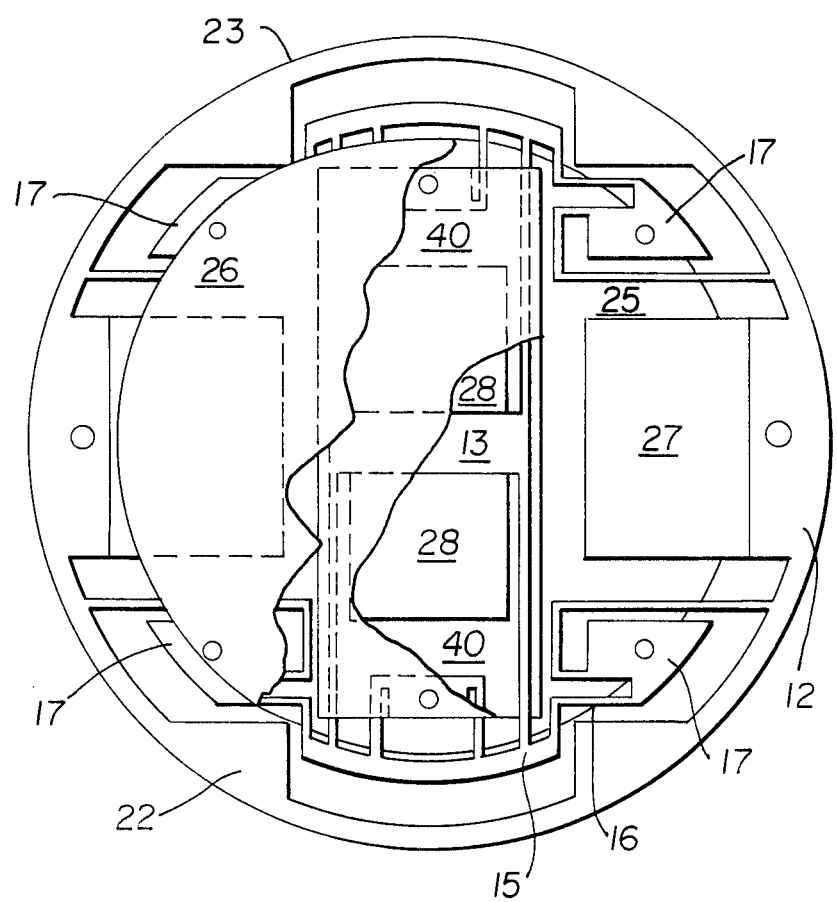
FIG. 7 is a partial cut-away plan view of the lens assembly of FIG. 6.

FIG. 3 is a drawing of a two-axis positioner constructed according to the invention. It consists essentially of the device shown in FIG. 1 to provide motion along one axis, and the device shown in FIG. 2 to guide the motion in the other direction at right angles to the first. The object to be positioned is attached to the central block-like movable object member 13 which is supported by four thin rectangular cross section strips 14 which are attached to two supporting bars 15. The ends of bars 15 are attached to blocks 17 by four right angled springs 16. If blocks 17 are regarded as fixed, the arrangement so far described functions in the same way as the device shown in FIG. 1. In the two axis device, however, blocks 17 are rigidly coupled together by one or more plates (25 and 26 in FIG. 7), and this plate and blocks 17 serve as the supporting means for one single axis positioner and as the movable object member for a second single axis positioner in which the plate serves as the object member 11 in the device shown in FIG. 2, with blocks 17 serving the purpose of blocks 9 in FIG. 2. The four blocks 17 are therefore also connected by four right angled springs 18 to four thin strips 19 which serve as the hinge strips 8 of FIG. 2. Strips 19 are attached to mounting points on the fixed outer ring 23 which serves as the second supporting means for the positioner and has two lugs 12 to secure it to the rest of the apparatus. Four end stops 22 are also provided to limit the motion of object member 13 but these are not essential.

A device of the type shown in FIG. 3 is primarily intended to provide an oscillating motion in two dimensions as required for scanned image microscopy, as previously explained. This is by no means its only application, however. When it is used as an oscillating scanner, it will be obvious that scanning along the axis which results in the deflection of springs 14 can be achieved more quickly than along the other axis, because the mass of the components to be moved is smaller. This axis should therefore be used as the fast scan axis. The driving force for both axes is conveniently obtained from electromagnetic drive motors, such as that described below. In order to ensure substantially vibration free oscillation and to minimize the coupling of the fast scan motion into the slow scan axis, the stator (40 in FIG. 7) of the drive motor for the fat scan axis is mounted on small blocks 21 which, to obtain the compensating effect described previously, are resiliently supported by two thin strips 20 from the bars 15 which constitute the stator mounting means. Preferably blocks 21 should be linked by a supporting plate for the motor stator to provide increased resistance to twist, as explained.

The whole device shown in FIG. 3 can be made quite small and still provide a reasonable amplitude of motion. For example, if the overall diameter is 50 mm, a range of ±1 mm along each axis is easily achieved. The best method of fabricating the device shown in the figure is to make it from a single solid piece of material. The mounting holes are first drilled in a blank disc, and the entire shape can then be cut out by means of a process such as spark erosion. A blank up to 15 mm deep can be accurately cut in this way. The precision involved, however, is at present not adequate for the fabrication of the thin tie member required in the invention, and consequently these are spark machined about 0.15 mm oversize, and the completed block is then chemically etched to reduce the thickness to about 0.0125 mm or so. The springs will generally be about 0.3 mm thick, and should be spark machined oversize as well so that the etched dimension is correct. The removal by etching of material from the larger parts will have no significance. Fabrication in one piece in this way results in very strong junctions between the flexing parts, which would probably be impossible to achieve in any other way. It also results in a device that is almost completely unaffected by changes in ambient temperature, which is a very important advantage. However, more conventional methods of manufacture can be employed if desired, especially if a larger positioner is to be constructed.

Figure 4:
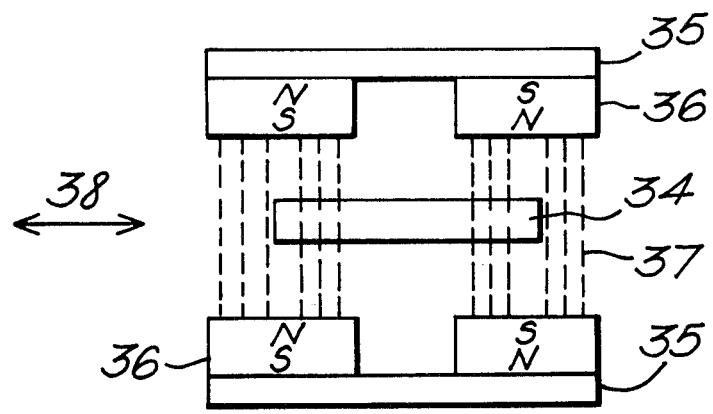
FIG. 4 shows a simplified elevation of part of an electromagnetic drive motor suitable for use in the invention.
Figure 5:
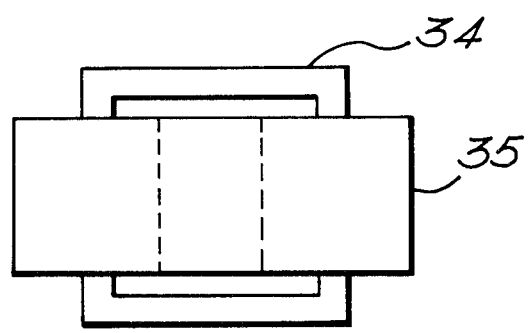
FIG. 5 is a simplified plan view of the motor shown in FIG. 4.

FIGS. 4 and 5 illustrate the principle of operation of an electromagnetic drive motor which can be used with the scanner shown in FIG. 3. The armature of the motor consists of a flat square coil 34 suspended in a magnetic field, indicated by the dotted lines 37 in FIG. 4, which is created by four magnets 36 arranged above and below the plane of the coil as shown. The magnetic circuit between the pairs of magnets is completed by the plates 35. The passage of a current through the coil results in its displacement along axis 38, and an oscillatory motion can be produced by passing an alternating current through the coil. Preferably a pair of symmetrically placed drive motors operating in phase should be used to provide the motion along both axes in the positioners described to ensure that the driving force is applied symmetrically. However, in some cases it may be preferable to use the second motor as a generator to provide servo control of the driving force and to indicate the actual position of the scanned object. The use of servo control can be adapted to provide a controlled damping of the oscillatory motion which further suppresses vibration.

It will be seen that a scanner of the type shown in FIG. 3 when provided with drive motors of the type described can be incorporated in any scanned image microscope to scan either the position of the object, the lens, or the radiation source. No difficulty will be presented to those skilled in the art by the design of the details needed to fit the scanner to an instrument of this kind. However, as an example, FIG. 5 shows how a scanner can be built into a small assembly capable of fitting on the turret of a conventional optical microscope in place of one of the optical objectives, thereby providing a combined optical and scanning acoustic microscope as required by the invention.

Further examples of the inclusion in scanning microscopes of scanners of the type shown in FIG. 3 are shown in FIGS. 8 and 9. FIG. 8 illustrates a scanning microscope 41 which comprises a conventional microscope 44 having a base 45 and a turret 48 carying at least one optical and/or acoustic lens 49. A specimen 50 is mounted on a movable stage 42 itself mounted from base 45 by a two axis positioner 43 according to the invention constructed as described above. Stage 42 may, for example, be attached to movable object member 13 of the positioner of FIG. 3 with outer ring 23 of the positioner being secured to conventional microscope specimen stage 46. Thus, specimen 50 can be moved rapidly and reproducably along two axes relative to lens 49 using positioner 43. An alternative embodiment of a scanning microscope is shown in FIG. 9 which has turret 48 carrying optical objective lenses 49 and, in housing 24, a scanning acoustic lens asembly of the type shown in FIG. 6.

Figure 6:
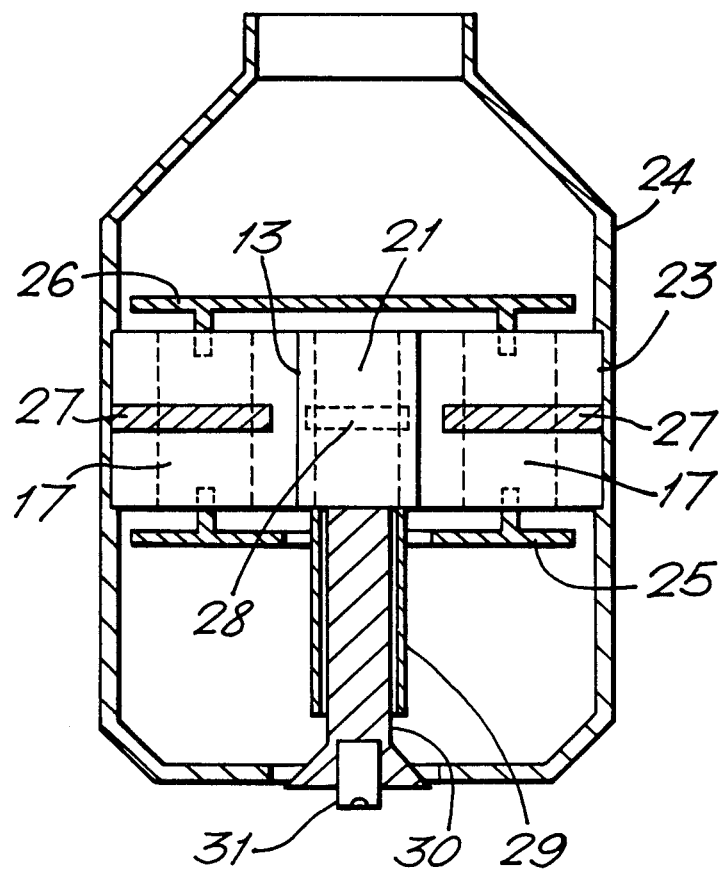
FIG. 6 is a simplified sectional view of a scanning acoustic lens assembly incorporating the two axis positioner shown in FIG. 3.

In FIG. 6, which is greatly simplified by the omission of certain components for the sake of clarity, the outer ring 23 of a positioner scanner constructed according to FIG. 3, is supported in a circular housing 24 which is attached at its upper end to the microscope turret 48. The central block-like movable object member 13 of the positioner scanner supports a lens mounting tube 30, preferably made of brass, which carries the sapphire acoustic lens and transducer 31 at its lower end. This is surrounded by a brass tube 29, also supported on object member 13 which also incorporates an electrical heater (not shown), thus enabling the lens 31 and the coupling medium between it and the object (usually water), to be maintained at a suitable temperature (typically 60° C.).

The drive motor for the fast scan axis has an armature 28 (comprising two coils attached to either side of the central movable object member 13) and a stator 40 (comprising two plates disposed respectively above and below object member 13). Each of the plates of stator 40 is attached to blocks 21 and thus to bars 15, the stator mounting means of the positioner. Permanent magents are fitted to each of the plates of stator 40 so that a drive motor operating according to the principle described is provided. The armature of the drive motor for the slow scan axis comprises two fixed coils 27 attached to the outer ringer 23 and the stator comprises two plates 25 and 26 attached to blocks 17 with magnets being fixed to plates 25 and 26 in order that another drive motor operating on the principle described is provided.

Clearly, provision must also be made for the coaxial cable connection to the transducer, and for the electrical leads needed for the heater and motor supplies, etc. This will present no difficulty to those skilled in the art.

Although examples of the use of the invention in scanned image microscopy have been given, it will be appreciated that the invention is not limited to this field, and the positioners can be used to provide accurate guiding of the motion of an object in apparatus which requires such positioning.

We claim:

1. A substantially frictionless positioner for guiding the motion of an object along an axis when a displacing force is applied, said positioner comprising a movable object member connected to a supporting means fixed relative to said axis by two matched parallel motion solid hinges disposed on opposite sides of said axis in a common plane, each said parallel motion solid hinge comprising two or more flexible tie members and at least one stretchable spring means which maintains said tie members in tension, said stretchable spring means and said tie members operating to permit motion of said movable object member from a rest position fixed relative to said supporting means along said axis without displacement therefrom and to return said movable object member to said rest position when said displacing force is removed.

2. A substantially frictionless positioner according to claim 1 in which said flexible tie members comprise strips of rectangular cross-section disposed with a major surface substantially perpendicular to said common plane, and said stretchable spring means comprise a resilient strip of rectangular cross-section disposed with a major surface substantially perpendicular to said common plane, said resilient strip having at least one bend along a line substantially perpendicular to said common plane in order to allow stretching substantially only in said common plane, thereby ensuring that the motion of said movable object member is confined substantially to said common plane.

3. A substantially frictionless positioner for guiding the motion of a primary object member along two axes, said positioner comprising a first positioner according to claim 2, the movable object member whereof comprises said primary object member, the said supporting means of said first positioner being rigidly connected to the movable object member of a second positioner according to claim 2, and the said axes of said first and second positioners being aligned with the two axes along which said primary object member is to be guided.

4. A substantially frictionless positioner according to claim 1 in which said flexible tie members forming part of each said parallel motion solid hinge are linked by an intermediate rigid member at their ends remote from said movable object member, and each said intermediate rigid member is connected by at least one of said stretchable spring means to said supporting means.

5. A substantially frictionless positioner according to claim 4 further comprising an electromagnetic drive motor for providing said displacing force and comprising at least one armature and at least one stator, said armature being attached to said movable object member and said stator being connected to said intermediate rigid member by two further parallel motion solid hinges each comprising at least two flexible tie members and at least one stretchable spring means.

6. A substantially frictionless positioner for guiding the motion of a first movable object member along first and second axes, said positioner comprising a first single axis positioner according to claim 5 capable of guiding the motion of said first movable object member along said first axis, the supporting means of said first positioner being rigidly coupled to a second movable object member supported from a second supporting means by two further parallel motion solid hinges disposed in a common plane on opposite sides of said second axis, each said parallel motion solid hinge comprising two or more further flexible tie members and at least one further stretchable spring means which maintains said further tie members in tension, said further stretchable spring means and said further tie members operating to permit motion of said second movable object member along said second axis without displacement therefrom.

7. A substantially frictionless positioner according to claim 6 in which said further flexible tie members comprise flexible strips of rectangular cross-section disposed with a major surface substantially perpendicular to said common plane, and said further stretchable spring means comprise a resilient strip of rectangular cross-section disposed with a major surface substantially perpendicular to said common plane, said resilient strip having at least one bend along a line substantially perpendicular to said common plane in order to allow stretching substantially only in said common plane.

8. A substantially frictionless positioner according to claim 7 in which each said further flexible tie member is separately connected with one of said stretchable spring means to form a composite part having a tie member end and a spring member end, each said composite part being disposed with said tie member end attached to said second supporting means and said spring member end attached to said second movable object member.

9. A substantially frictionless positioner according to claim 1 in which each said flexible tie member is separately connected to one of said stretchable spring means.

10. A substantially frictionless positioner according to claim 1 in which a plurality of composite parts are provided, each said composite part comprising one said stretchable spring means and one said flexible tie member, and said composite parts being disposed linking said movable object member to said supporting means and maintained under tension by virtue of their being stetched on assembly of said positioner.

11. A substantially frictionless positioner according to claim 1 further comprising an electromagnetic drive motor for providing said displacing force and comprising at least one armature and at least one stator, said armature being attached to said movable object member and said stator being mounted on a stator mounting means by at least one further parallel motion solid hinge comprising two flexible and stretchable tie member, the resilence and length of which are selected so that when said movable object member is displaced, displacement of said stator in the opposite direction reduces the change in the position of the centre of gravity of said positioner.

12. A substantially frictionless positioner for guiding the motion of a primary object member along two axes, said positioner comprising a first positioner according to claim 1, the movable object member whereof comprises said primary object member, the said supporting means of said first positioner being rigidly connected to the movable object member of a second positioner according to claim 1, and the said axes of said first and second positioners being aligned with the two axes along which said primary object member is to be guided.

13. A scanning microscope comprising a positioner and a movable stage for scanning the position of an object to be examined, said stage being guidable along an axis when a displacing force is applied by means of said positioner, said positioner comprising a movable object member attached to said movable stage, said movable object member being connected to a suporting means fixed relative to said axis by two matched parallel motion solid hinges disposed on opposite sides of said axis in a common plane, each said parallel motion solid hinge comprising two or more flexible tie members and at least one stretchable spring means which maintain said tie members of tension, said stretchable spring means and said the members operating to permit motion of said movable object member from a rest position fixed relative to said supporting means along said axis without displacement therefrom and to return said movable object member to said rest position when said displacing force is removed.

14. A scanning microscope according to claim 13 further comprising means for guiding the motion of said movable stage along a second axis when a second displacing force is applied, said means comprising a second movable object member rigidly connected to said supporting means, and said second movable object member being connected to a second supporting means fixed relative to aaid second axis by two further matched parallel motion solid hinges disposed on opposite sides of said second axis in a common plane, each said hinge comprising two or more further flexible tie members and at least one one further stretchable spring means which maintains said further flexible tie members in tension, and said further flexible tie members and stretchable spring means operating to permit motion of said second movable object member from a rest position fixed relative to said second supporting means along said second axis without displacement therefrom and to return said second movable ojbect member to said rest position when said displacing force is removed.

15. A scanning microscope comprising a positioner and a movable lens capable of being scanned over an object to be examined, said lens being guidable along an axis when a displacing force is applied by means of said positioner, said positioner comprising a movable object member on which said lens is mounted, said movable object member being connected to a supporting means fixed relative to said axis by two matched parallel motion solid hinges disposed on opposite side of said axis in a common plane, each said hinge comprising two or more flexible the members and at least one stretchable spring means which maintains said tie members in tension, said stetchable spring means and said tie members operating to permit motion of said movable object member from the rest position fixed relative to said supporting means along said axis without displacement therefrom and to return said movable object member to said rest position when said displacing force is removed.

16. A scanning microscope according to claim 15 further comprising means for guiding the motion of said lens along a secon axis when a second displacing force is applied, said means comprising a second movable object memver rigidly connected to said supporting means and being connected to a second supporting means fixed relative to said second axis by two further matched parallel motion solid hinges disposed on opposite sides of said second axis in a common plane, each said further hinge comprising two or more further flexible tie members and at least one further stretchable spring means which maintains said further flexible tie members in tension, and said further flexible tie members and stretchable spring means operating to permit motion of said second movable object member from a rest position fixed relative to said second supporting means along said second axis without displacement therefrom and to return said second movable object member to said rest position when said displacing force is removed.

17. A scanning microscope according to claim 16 in which said lens is an acoustic lens.

18. A scanning microscope according to claim 17 in which said second supporting means is mounted on a turret which additionally carries at least one optical objective lens, said turret being adapted to bring either said optical objective lens or said acoustic lens into an operable position as required, said scanning microscope further comprising an imaging optical microscope incorporating said optical objective lens whereby an optical image of said object to be examined can be obtained by positioning said turret so that said optical lens is in said operable position in place of said acoustic lens, and said optical objective lens and said second supporting means being disposed on said turret in such a way that when selected, the respective focal points of said optical lens and said acoustic lens when at rest lie substantially on the same point on said object to be examined.

19. A scanning microscope according to claim 15 in which said lens is an acoustic lens.

20. A scanning microscope according to claim 19 in which said supporting means is mounted on a turret which additionally carries at least one optical objective lens, said turret being adapted to bring either said optical objective lens or said acoustic lens into an operable positon as required, said scanning microscope further comprising an imaging optical microscope incorporating said optical objective lens whereby an optical image of said object to be examined can be obtained by positioning said turret so that said optical lens is in said operable position in place of said acoustic lens, and said optical objective lens and said supporting means being disposed on said turret in such a way that when selected, the respective focal points of said optical lens and said acoustic lens when at rest left substantially on the same point on said object to be examined.

* * * * *